United States Patent [19]

Kessler et al.

[11] Patent Number: 5,180,618
[45] Date of Patent: Jan. 19, 1993

[54] SEPARABLE FASTENERS FOR ATTACHMENT TO OTHER OBJECTS

[75] Inventors: William F. Kessler, Clarkston; Dennis R. Clutch, Rochester, both of Mich.; William J. Kennedy, Manchester, N.H.

[73] Assignee: Velcro Industries B.V., Netherlands

[21] Appl. No.: 736,093

[22] Filed: Jul. 26, 1991

Related U.S. Application Data

[63] Continuation-in-part of Ser. No. 470,128, Jan. 25, 1990, Pat. No. 5,061,540.

[51] Int. Cl.$^5$ ............................................. A44B 21/00
[52] U.S. Cl. ..................................... 428/100; 428/120; 428/900; 24/444
[58] Field of Search ................... 428/100, 120, 900; 24/442, 444

[56] References Cited

U.S. PATENT DOCUMENTS 4,842,916  6/1989  Ogawa et al. ............... 428/100

Primary Examiner—Alexander S. Thomas
Attorney, Agent, or Firm—Hayes, Soloway, Hennessey & Hage

[57] ABSTRACT

A strip of fastener material adapted for securing to the surface of a foam bun during molding, carries on a first surface an area of outwardly extending fastening elements constituting one half of a touch fastening system. The first surface is arranged to be positioned so that it faces into a trough in a mold wall and this first surface is provided with a pair of elongated flexible sealing lips adjacent the edges of the are. Magnetizable means are also carried by the strip and the fastener strip has portions extending laterally beyond the sealing lips and beyond the edges of the trough in the mold wall. A strip of removable pressure sensitive tape covers the surface of the fastening elements and extends completely between the lips.

9 Claims, 3 Drawing Sheets

SEPARABLE FASTENERS FOR ATTACHMENT TO OTHER OBJECTS

BACKGROUND OF THE INVENTION

Field of the Invention

This application is, in part, a continuation of our co-pending application Ser. No. 07/470,128 filed Jan. 25, 1990 now U.S. Pat. No. 5,061,540.

This invention relates to an improved product for adapting separable fasteners, particularly those of the hook and loop type, for attachment to other objects, particularly such objects as polyurethane foam seat cushions for automobiles, furniture and the like. In this known method one portion of a separable fastener is incorporated into the foam object during the molding process for subsequent attachment to another object carrying the mating portion of the separable fastener. The fastener of the invention is easier to produce, store, transport, and use in the mold-in process and provides improved results both during and after the mold-in process.

Description of the Prior Art

Hook and loop type separable fasteners, such as those sold by the assignee of this application under the trademark Velcro®, are well-known and are used to join two members detachably to each other. This type of fastener has two components. Each has a flexible substrate material having one component of the fastening system on the surface thereof. One surface is typically comprised of resilient hooks while the other is comprised of loops, and when the two surfaces are pressed together they interlock to form a releasable engagement.

Separable fasteners have in recent years been used in the manufacture of automobile seats in the attachment of an upholstered seat cover to a polyurethane foam bun. One portion of the separable fastener is incorporated onto the surface of the polyurethane foam bun during the foam molding process. The mating portion of the separable fastener is attached to the seat cover to provide releasable attachment to the foam bun. The separable fastener assembly used in the foam mold for incorporation in the bun surface typically comprises the hooked portion of a separable fastener. This hook portion is characterized by a substrate carrying resilient hooks on one surface. The other surface of the substrate may carry projections to become incorporated into the foam to provide stable attachment of the separable fastener assembly to the foam article. In some assemblies, a magnetizable shim is often attached to the substrate to facilitate placement of the assembly in a trough of the mold cavity wall, which is equipped with magnets. A protective layer, usually in the form of a thin plastic film, may be placed over the resilient hooks to prevent incursion of foam into the hooks during the molding process, since significant foam contamination of the hooks would affect their ability to engage with the mating portion of the fastener attached to the seat cover. The assemblies are usually subjected to ultrasonic flattening at pre-determined lengths in order to mark the assembly for cutting, thus providing finished terminal ends.

The present state of the art relating to the attachment of such fastener means to foamed seat cushions and the like is generally represented by French patents 2,405,123 and 2,423,666 as well as the following U.S. Patents:

U.S. Pat. No. 4,470,857, issued Sep. 11, 1984 in the name of Stephen J. Casalou and assigned to R. A. Casalou, Inc.;

U.S. Pat. No. 4,563,380, issued Jan. 7, 1986 in the name of Philip D. Black and assigned to Minnesota Mining and Manufacturing Company;

U.S. Pat. No. 4,673,542, issued Jun. 16, 1987 in the name of Lauren R. Wigner and assigned to General Motors Corporation;

U.S. Pat. No. 4,693,921, issued Sep. 15, 1987 in the name of Patrick J. Billarant and Bruno Queval and assigned to Aplix;

U.S. Pat. No. 4,710,414, issued Dec. 1, 1987 in the name of Walter E. Northrup and Maurice E. Freeman and assigned to Minnesota Mining and Manufacturing Company; and U.S. Pat. No. 4,726,975, issued Feb. 23, 1988 in the name of Richard N. Hatch and assigned to Actief N.V. ABN Trust Co.

Such mold-in separable fastener assemblies presently in use, while proving to be superior means of attaching a seat cover to a foam bun, have presented several problems. One disadvantage of the separable fastener assemblies of the type disclosed in U.S. Pat. No. 4,673,542 is that the thin plastic film layer used to cover the hooks is sealed around the edges and must be removed after the mold-in process, thus requiring an additional and somewhat painstaking step in the manufacture of the foam seat bun. It also requires an additional component in the manufacture of the assembly which must be attached to the separable fastener tape with an adhesive. In addition, an adhesive-backed tape is usually affixed to the film layer to assist in its removal. Other prior-art assemblies, including those disclosed in U.S. Pat. Nos. 4,726,975, 4,563,380 and 4,693,921 also employ a thin layer of film to prevent the incursion of foam into the projections of the separable fastener portion during mold-in.

French Patent 2,423,666 discloses a system for sealing the edges of the tape in the mold trough by jamming the edges into the trough. It is not believed that this system, which is particularly shown in FIG. 3 of the French Patent, ever achieved any commercial success.

French Application 2,466,330 published Apr. 10, 1981 to Roth Freres S. A. describes a tape having a fastening surface of loops, as distinguished from hooks, is to be embedded in a foam bun. The loop surface is provided with a double face strip of adhesive tape which can secure the nap surface of the loop material to the surface of the mold. However, this is a flat mold and no effort is made to prevent edge penetration of the foaming material into the loop surface. However, since the loop surface is a dense pile fabric, there probably is not a great deal of penetration. As far as is known, this product never received any commercial acceptance.

BRIEF SUMMARY OF THE PRESENT INVENTION

As described in the parent application, there is provided a novel fastener strip which, as in the prior art, carries on a first surface an area of outwardly extending fastener elements, preferably hooks. These fastening elements constitute one-half of a touch fastening system, and these hooks are positioned in a mold trough facing toward the trough interior. In the present invention the strip of material is impermeable and carries on the first surface, adjacent to the edges of the area of fastening hooks, continuous flexible sealing lips which extend generally normal to the strip and are longer than the fastening hooks. These sealing lips are jammed against the bottom or sides of the trough in the mold cavity so as to form a flexible seal which is impermeable to the liquid to be foamed in the formation of the seat cushion. In addition, the strip has a porous backing layer secured thereto which constitutes a foam engaging element. This foam engaging element can also be integral tabs having holes which permit the foam to be formed completely through and around these tabs as described in the parent application. The face carrying the hook elements also preferably has transverse sealing means which engage the mold troughs adjacent the ends thereof so as to seal against endwise penetration of the foaming liquid. One type of transverse sealing means is a sealing lip similar to the longitudinal lips, and another type is a thick foam strip. A magnetizable strip is preferably carried on the back of the fastener strip. In a preferred embodiment, this magnetizable strip is corrugated transversely so that it has great flexibility when the composite element is flexed around an axis transverse to its longitudinal direction, but is very stiff when attempts are made to flex the strip around an axis parallel to its long direction. This transverse stiffness provides for the transmission of strong sealing forces from the magnetizable strip to the longitudinally running sealing lips due to the magnetic attraction of the magnetizable strip by the mold-mounted magnets. Thus the sealing lips are held in tight engagement with the surface of the mold trough.

In some mold arrangements, there may be a slight curve to the mold surface which prevents intimate contact of the sealing lips with the surface of the mold trough or there may be surface roughness or other imperfections in the mold which prevent tight engagement of the end of the sealing lip with the surface of the mold. In this case, small amounts of foaming material may penetrate under the end of a lip and penetrate the tightly spaced hook surface. In order to prevent this inadvertent penetration of foam in the present invention, a removable sealing layer is provided to cover the ends of the hooks and extend completely between the lips. However, the lips are free of the sealing layer and the combined thickness of the sealing layer and the hooks is less than the height of the lips. This sealing layer, preferrably comprises a pressure sensitive tape which is removably secured to the dense layer of hooks, constituting the hook surface. After foam molding, this pressure sensitive tape is easily removed from the finished product. For this purpose, the tape is sufficiently strong so that the tensile strength of the tape greatly exceeds the bond with the ends of the hooks. Since the bond is only at the tips of the hooks, the sealing tape can be readily removed from these hooks after molding.

BRIEF DESCRIPTION OF THE DRAWINGS

In order to more fully understand the invention, reference should be had to the following detailed description taken in connection with the attached drawings wherein.

DESCRIPTION OF THE PREFERRED EMBODIMENTS

Figure 1:
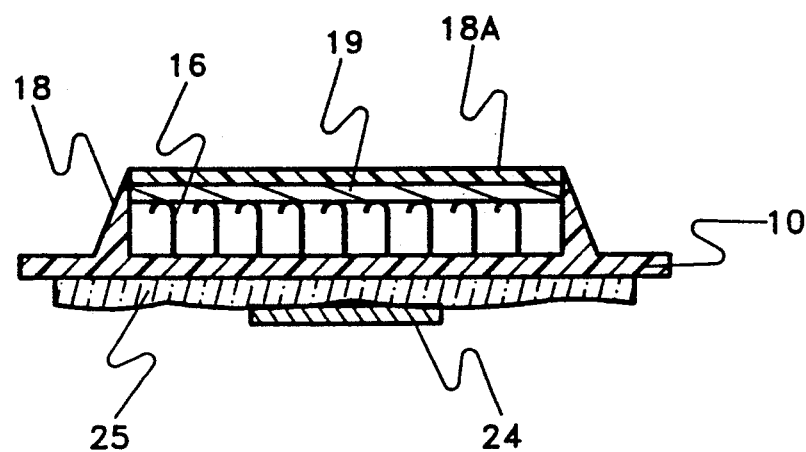
FIG. 1. is a diagrammatic, schematic, partially sectional view of one preferred form of the invention.
Figure 2:
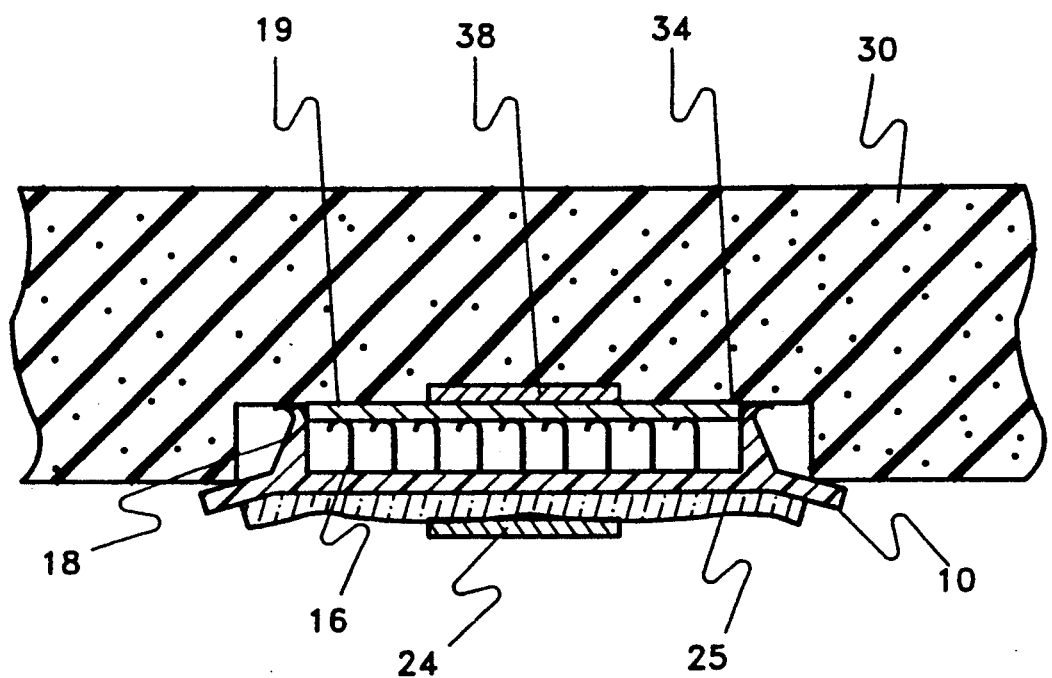
FIG. 2. is a diagrammatic, schematic, partially sectional view of the invention of FIG. 1 mounted in a trough in a mold wall.
Figure 3:
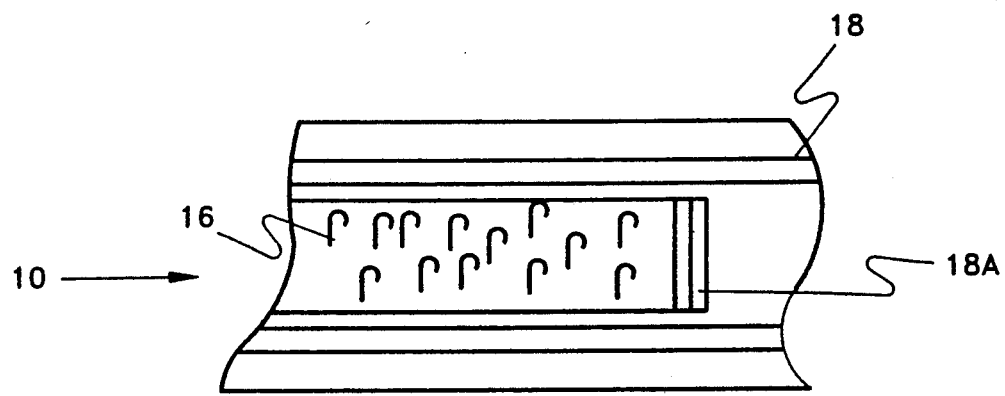
FIG. 3 is a plan view of the invention of FIG. 1.
Figure 5:
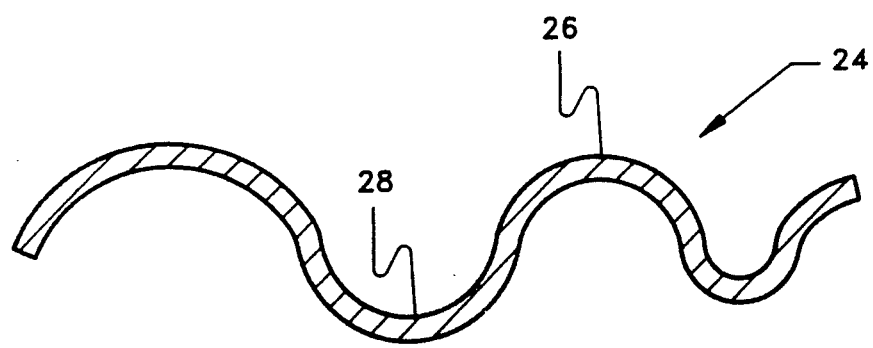
FIG. 5 is a sectional view of the magnetizable strip.

Referring now to FIGS. 1, 2 and 3, there is shown one preferred fastener strip of the present invention, wherein the strip is generally indicated at 10 as having a front surface 12 and a rear surface 14. Mounted on the front surface 12 is an area of fastening elements shown schematically as hooks 16. Flexible sealing lips 18 run transversely along both sides of the area of the hooks 16. A transverse sealing lip 18a may also be provided periodically across the strip. A sealing layer 19 is adhesively and removeably secured to the ends of the hooks 16, the thickness of the sealing layer 19 plus the height of the hooks 16 being less than the height of the lips 18. The relationships of the sealing lips 18 and 18a and the area of hooks 16 is shown best in FIG. 3, which is a plan view of the product shown in section in FIG. 1 with the sealing layer 19 removed. The strip 10 has laterally extending portions 20 which extend laterally on both sides of the strip somewhat beyond the sealing lips 18. Mounted on the back of the fastener strip is a magnetizable strip 24 which is transversely corrugated as shown in FIG. 5 so that it has peaks 26 and valleys 28. These corrugations run transversely to the length of the strip so that it is flexible when bent around axis extending transversely to its long dimension, but is very stiff to resist bending across the strip. On the back of the impermeable sealing strip 10 is secured an open weave cloth layer 25 which is secured to layer 10 by appropriate means such as ultrasonic sealing, hot melt adhesive or other adhesive means well known in the art. As can be seen this open weave layer 25 is underneath the magnet strip 24. The function of this open weave layer 25 is to engage the foam by permitting the foam to penetrate this layer 25 and embedded the layer 25 in the foam so as to anchor the hook assembly in the foamed bun.

Referring now to FIG. 2 in more detail, the strip is shown as held in position by the attraction of a mold magnet 38 in the back of a trough 32 in a mold wall 30. As can be seen, the sealing lips 18 engage a bottom surface 34 of the trough 32, so as to seal the hooks 16 against penetration of foam into that portion of the trough 32 containing the hooks 16. The sealing layer 19 extends between the lips 18 and additionally seals the hooks in those cases where the mold surface is sufficiently curved or rough as to prevent complete sealing between the end of lips 18 and the mold wall. The attraction of the magnetizable strip 24 to the mold-mounted magnet 38 is sufficiently strong to bend the tips of flexible sealing lips 18 and form a very tight seal.

Figure 4:
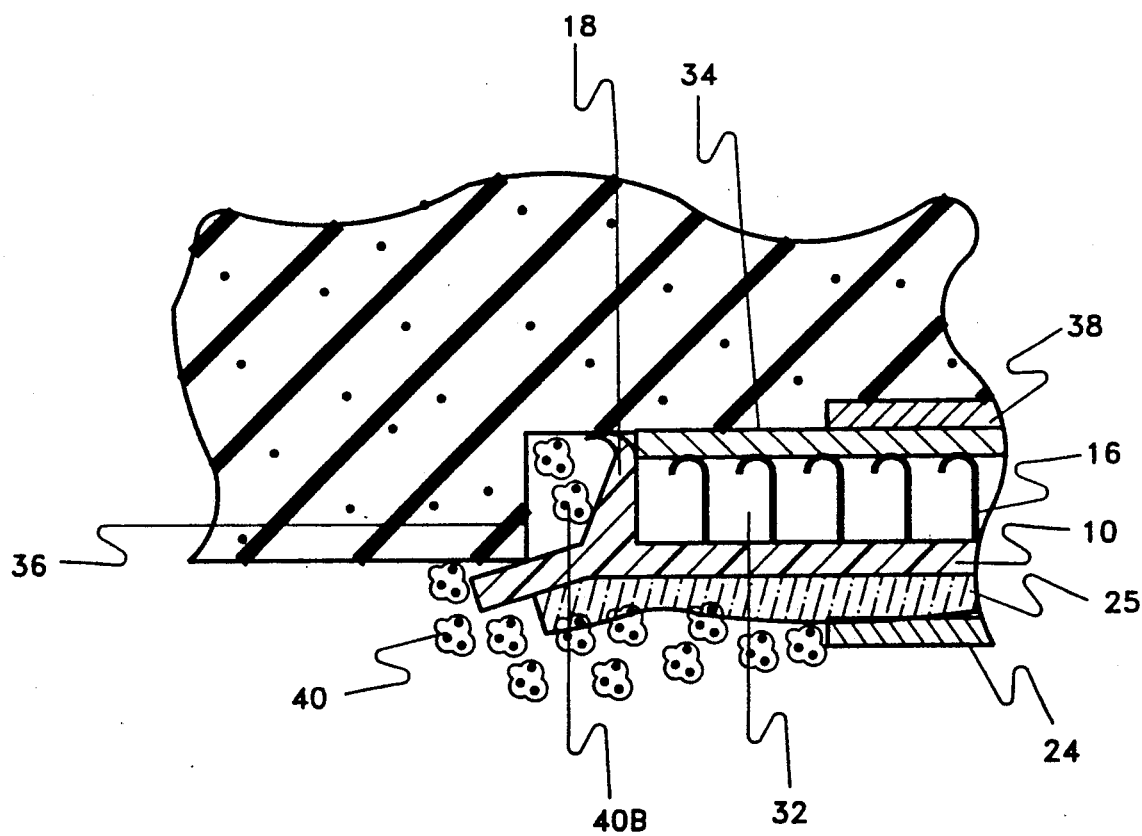
FIG. 4 is an enlarged sectional view similar to FIG. 2 showing the penetration of the foam.

Referring now to FIG. 4 there is shown an enlarged sectional view of the product, wherein a foam material 40 has penetrated through the hole 22 and completely penetrates the layer 25 to form a strong mechanical bond to this layer. While some portion of the foam is shown as passing from the area 40A to the volume 40B between the sealing lip 18 and the vertical edge 36 of the trough 32, the sealing lip 18 prevents entry of any appreciable amount of this foam into the portion of the trough 32 facing the hooks 16. Any foam which passes the lips, due to curves or surface roughness, is kept from penetrating the hooks by reason of the sealing layer 19. Thus, the foam provides strong mechanical bond to the fastener strip, but is completely sealed from the hooks 16. When the foamed cushion of the cured foam is removed from the mold, the sealing strip 19 is peeled away from the ends of the hooks and no further treatment of the product is required. The hooks are all free of foam and ready to engage the matching fastener elements on the seat cover.

In a preferred form of the invention, the strip is made by extrusion, particularly as described in Fischer U.S. Pat. No. 4,794,028 owned by the assignee of the present invention. The lips 18 are preferably formed at the time of initial extrusion, although they can be formed later by thermal deformation. The transverse strips of sealing lips 18A are preferably formed after initial extrusion of the product by ultrasonic formation or the like. At this time, the ends of each strip segment may be treated, such as by flattening the hook areas. The magnetizable strip 24, the sealing layer 19, and the open weave layer 25 can be attached to layer 10 by laminating equipment.

In one preferred form of the invention the material of the fastener strip is polypropylene and the magnetizable strip is made from steel 0.003-0.004 inch thick which is corrugated to give a crimp amplitude of about 0.032 inch with 10 crimps per inch.

Figure 6:
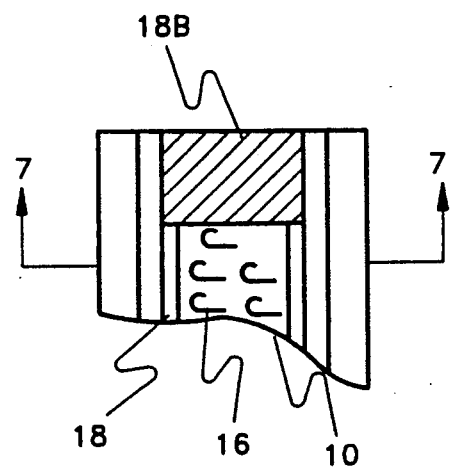
FIG. 6 is a plan view of another preferred form of the invention.
Figure 7:
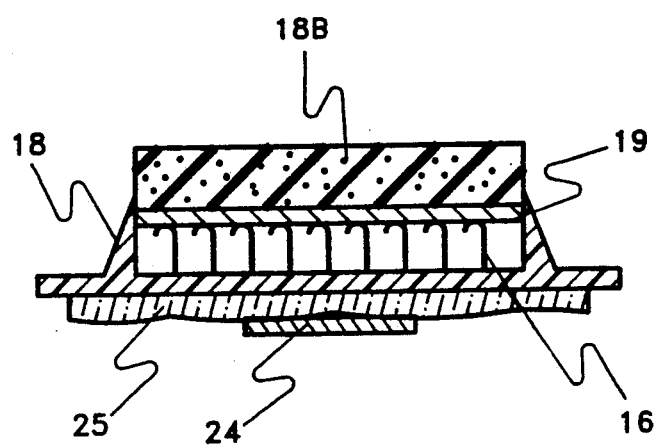
FIG. 7 is a sectional view of FIG. 6 taken along the line 7—7 of FIG. 6.

Referring now to FIGS. 6 and 7, there is illustrated another preferred form of the invention which is particularly useful for providing fastener strips to be used in mold troughs of different lengths. In this embodiment the initial product is formed as a long strip which is then die cut in the same fashion as described above for FIGS. 1–3. Thereafter, the strip is cut to the exact length of the mold trough and the end seal is provided by securing to the hook area at each end a piece of foam 18b which is considerably thicker than the height of the lips 18 and which spans the space between these lips 18. This foam is sufficiently compressible (to less than the height of the lips) so that it does not interfere with the tight deforming engagement between the end of the lips 18 and the bottom 34 of the mold trough 32 under the attractive force of the mold-mounted magnets 38. The compressed foam at each end completely seals each end against penetration by the foaming liquid. Sealing layer 19 is omitted from FIG. 6.

In the preferred form of the invention, as illustrated in FIGS. 6 and 7, the substrate (10) is extruded from poly(propylene) with a base thickness measured as 0.020 inches. The hooks (16) are 0.065 inches high, measured from the bottom of the substrate, and the lips (18) range between 0.105 and 0.120 inches high tapering from a base of 0.012 inches wide to the flexible tip. They preferably have a density of about 700 hooks/in$^2$. These lips will deflect by approximately 0.011 inches under force of approximately 0.5 #/inch of strip applied over the entire width of the strip. The center portion carrying the hooks (16) deflects to touch the face of the mold under this pressure and at the center line the back of the part is 0.065 inches above the base. The sealing layer is preferably pressure sensitive tape such as that sold by Permacel, Division of Avery InTacti Co. under the designation masking tape and is 0.006 inch thick. The nonnwoven fabric layer 25 is preferably Pellon ® 850 sold by the Freudenberg Company. It is secured to the back of the extruded substrate by appropriate means such as ultrasonic sealing, hot melt adhesive or other adhesive means well known in the art. The foam piece (18b) is made of a laminated poly(urethane) foam sheet having a density of approximately 3 #/sq. foot laminated to a loop tricot fabric (a combination laminate sold by Velcro as "Vel-Foam ®"). This "Vel-Foam" will compress from its original thickness of 0.132 inches (measured under a pressure of 0.1 #/sq. inch) to a thickness of 0.104 inches under a pressure of 0.4 #/sq. inch). The foam piece is secured to the substrate by engagement of the loops on the face of the "Vel-Foam", which bond is accomplished by penetration of the hooks (16) into the loops on the face of the loop fabric laminated to the urethane foam sheet if the layer 19 is terminated short of the foam piece. Alternatively, the foam piece can be secure to the outer surface of the layer 19.

While a preferred embodiment of the invention concerns manufacture of the structure of the fastening element as a single integrated molded product, the various elements could be formed independently and be united permanently such as by ultrasonic bonding, the use of hot melt adhesives, etc.

We claim:

1. In a strip of fastener material adapted for securing to the surface of a foam bun during molding, wherein the fastener strip carries on a first surface an area of outwardly extending elements constituting one half of a touch fastening system, and wherein said first surface is arranged to be positioned so that it faces into a trough in a mold wall, wherein the strip of material is molded and carries on said first surface a pair of integrally formed elongated flexible sealing lips having a predetermined height adjacent to the edges of said area, and magnetizable means are carried by the strip, the fastening elements being integrally formed hooks, a foam engaging portion of a second surface of the strip is adapted to be embedded in the foam;

the improvement wherein a removable sealing layer covers the ends of said hooks and extends completely between said lips, said lips being free of said sealing layer, the combined thickness of the sealing layer and the hooks being less than the height of the lips.

2. The fastener material of claim 1, wherein said hooks have a density of at least 500 hooks per in$^2$.

3. The fastener material of claim 1, wherein said sealing layer has a pressure sensitive adhesive on the surface facing the hooks.

4. In a strip fastener material adapted for securing to the surface of a foam bun during molding, wherein the fastener strip carries on a first surface an area of outwardly extending fastening elements constituting one half of a touch fastening system, and wherein said first surface is arranged to be positioned so that it faces into a trough in a mold wall, wherein the strip of material carries on said first surface a pair of elongated flexible sealing lips adjacent the edges of said area, magnetizable means carried by the strip, the fastener strip having portions extending laterally beyond the sealing lips and beyond the edges of the trough in the mold wall, and a portion of said strip outside of the volume defined by the sealing lips and being adapted to be buried in the foam;

the improvement wherein a removable sealing layer covers the ends of said fastening elements and extends completely between said lips, said lips being free of the sealing layer, the combined thickness of the sealing layer and the fastening elements being less than the height of the lips, said sealing layer being held in place only by engagement with the outer ends of the fastening elements.

5. The fastener of claim 4 wherein the portion of the strip adopted to be buried in the foam comprising an open mesh fabric.

6. The fastener of claim 5 wherein said fabric is between the magnetizable means and the strip of material.

7. The strip fastener of claim 4 wherein the sealing layer has a pressure sensitive adhesive on the surface engaging the ends of the hooks.

8. The strip fastener of claim 7 wherein the sealing layer has a tensile strength greater than the adhesive force bonding it to the ends of the hooks.

9. The strip fastener of claim 7 wherein there are at least several hundered hooks per square inch.

* * * * *

UNITED STATES PATENT AND TRADEMARK OFFICE
CERTIFICATE OF CORRECTION

PATENT NO. : 5,180,618

DATED : JANUARY 19, 1993

INVENTOR(S) : WILLIAM F. KESSLER, DENNIS R. CLUTH AND WILLIAM J. KENNEDY

It is certified that error appears in the above-identified patent and that said Letters Patent is hereby corrected as shown below:

Title page, item [75], line 2, "Clutch" should read --Cluth--.

Signed and Sealed this

Second Day of November, 1993

Attest:

BRUCE LEHMAN

*Attesting Officer*  *Commissioner of Patents and Trademarks*